(12) United States Patent  
Hahn

(10) Patent No.: US 8,634,135 B2  
(45) Date of Patent: Jan. 21, 2014

(54) OPTICAL PLUMMET FOR USE IN GEODESY

(75) Inventor: Wolfgang Hahn, Jena (DE)

(73) Assignee: Trimble Jena GmbH, Jena (DE)

( * ) Notice: Subject to any disclaimer, the term of this patent is extended or adjusted under 35 U.S.C. 154(b) by 0 days.

(21) Appl. No.: 13/438,791

(22) Filed: Apr. 3, 2012

(65) Prior Publication Data

US 2012/0287501 A1 Nov. 15, 2012

(30) Foreign Application Priority Data

May 12, 2011 (DE) ................... 20 2011 100 603 U

(51) Int. Cl.  
*G02B 23/00* (2006.01)

(52) U.S. Cl.  
USPC .......................................... 359/427; 359/428

(58) Field of Classification Search  
USPC ................... 359/427–429; 356/139.1; 33/292  
See application file for complete search history.

(56) References Cited

U.S. PATENT DOCUMENTS

| | | | | |
|---|---|---|---|---|
| 2,655,076 A * | 10/1953 | Armstrong | .................... | 359/410 |
| 3,712,704 A * | 1/1973 | Sato | .............................. | 359/416 |
| 4,367,010 A * | 1/1983 | Broome | ........................ | 359/425 |
| 6,724,471 B2 * | 4/2004 | Feist et al. | .................... | 356/148 |
| 7,102,817 B1 * | 9/2006 | Wu | ................................ | 359/384 |
| 7,885,530 B1 * | 2/2011 | Bushnell, III | ................. | 396/144 |
| 2002/0109914 A1 * | 8/2002 | Meier | ........................... | 359/399 |
| 2010/0214655 A1 * | 8/2010 | Kung | ............................ | 359/425 |

* cited by examiner

*Primary Examiner* — Frank Font  
(74) *Attorney, Agent, or Firm* — Kilpatrick Townsend & Stockton LLP

(57) ABSTRACT

An optical plummet for use in geodesy includes an eyepiece, a target mark, and an objective. The target mark is positioned in the beam path between the eyepiece and the objective and the target mark and the eyepiece are supported by a first body and the objective is supported by a second body. Either the first body or second body has two annular recesses spaced apart from each other along the beam path and disposed coaxially with respect to the beam path. Each of the annular recesses accommodates a ring. The other body has at least sectionally a cylindrical outer surface extending coaxially through the two annular recesses and rings along the beam path and is guided by the ring such that the distance between the eyepiece and the objective is adjustable by moving the first body and the second body relative to one other along the beam path.

20 Claims, 3 Drawing Sheets

OPTICAL PLUMMET FOR USE IN GEODESY

CROSS-REFERENCES TO RELATED APPLICATIONS

The present application claims priority to German Patent Application No. DE 20 2011 100 603.8, filed May 12, 2011, entitled "Optical Plummet for Use in Geodesy," the contents of which is hereby incorporated by reference in its entirety.

BACKGROUND OF THE INVENTION

In geodesy a plummet serves to center geodetic instruments, for example, a theodolite, a leveling instrument or a tachymeter (especially video tachymeter), over a ground mark, for example, a survey mark or reference mark.

Such geodetic instruments are frequently mounted to a tripod plate by means of a tribrach, the tribrach supporting the geodetic instrument and allowing the instrument to be aligned horizontally. Thus, the tripod via the tribrach indirectly supports the geodetic instrument. The tripod usually consists of three feet that support the tripod plate and are each adjustable in length. The tribrach is usually configured to be movable horizontally relative to the tripod plate and to be arrestable relative to the tripod plate in a desired position.

The plummet may be integrated in the geodetic instrument or fastened to the same. In this case, a respective tribrach has a central opening so as to not obstruct the plummet. As an alternative, the plummet may be integrated in a tribrach or fastened to the same. The tripod plate of the respective tripod comprises a central opening so as to not obstruct the plummet.

Mechanical plummets (plumb-bobs) usually consist of a weight suspended from a string, with a pointed tip at the free end of the weight. The string is fastened to the geodetic instrument or tribrach such that the line defined by the string, with freely suspended weight, extends through the measuring point of the geodetic instrument if the latter is horizontally aligned. This horizontal alignment is often performed by means of two straight bubble levels disposed orthogonally relative to one another or a bull's eye level. By shifting the instrument and/or tribrach, the tip of the freely suspended weight is set in line with the desired ground mark.

Such mechanical plummets involve the disadvantage that they are susceptible to vibration or flow of air and require some time to come from a vibrating initial state to a state of rest. Moreover, they have a low accuracy of only 3 mm to 5 mm at an instrument height of 1.5 m. Therefore, optical plummets are primarily used today in geodesy.

The optical structure of the optical plummet corresponds to that of a Keplerian telescope, the eyepiece of which comprises a target mark such as a reticle. The optical plummet is positioned in the geodetic instrument or tribrach in a way that the optical axis of the beam path guided in the optical elements of the optical plummet extends at least sectionally exactly along the nadir (that is in vertical direction) if the geodetic instrument is horizontally aligned. In order not to obstruct the arrangement of the geodetic instrument and in order to provide for a convenient access from the side, the beam path of the optical plummet is often folded by 90° for this purpose. Such optical plummets have an accuracy of better than <0.5 mm at an instrument height of 1.5 m. By shifting the instrument and/or tribrach, the target mark of the optical plummet is optically brought in line with the desired ground mark.

In order to obtain the desired accuracy, the focusing of the optical plummet must be adapted to the distance from the ground mark. In non-stationary geodetic instruments this must usually be performed after every positional change. This is because the distance of the plummet from the ground mark changes.

The use of focusers to enable an adjustable focusing is very complex in optical plummets, because such a focuser must meet very high accuracy requirements to ensure that the target mark in the eyepiece is always centered in the optical axis of the beam path guided in the optical elements of the optical plummet. Therefore, only a very small play of a few micrometers is admissible for the focuser. In addition to the use of a focuser for focusing purposes, a diopter adaptation is often enabled via the eyepiece of the plummet.

SUMMARY OF THE INVENTION

Embodiments provide an optical plummet for use in geodesy which allows the focusing of the optical plummet to be adapted to different distances from a ground mark (for example, a survey mark or reference mark) and can be manufactured at a favorable price without diminishing their accuracy.

According to embodiments, an optical plummet for use in geodesy consists of an eyepiece, a target mark (for example a reticle) and an objective. The target mark is positioned in the beam path between the eyepiece and the objective. A first body supports the target mark and the eyepiece and a second body supports the objective. The second body is a body different from the first body. Both the first and the second body may each consist of plural interconnected partial bodies and thus may each be provided in multipart form. One of the first body and second body comprises two annular recesses that are spaced apart from each other along the beam path between the eyepiece and the objective and are disposed coaxially with respect to the beam path between the eyepiece and the objective. Each of said annular recesses accommodates a ring. These rings may be closed (i.e. continuous) or may be radially slotted at one position. The recesses are provided inside the respective body, so that the annular recesses are open radially inwards and closed radially outwards. The other body (not comprising the annular recesses) comprises at least sectionally a cylindrical outer surface which is extending coaxially through the annular recesses and rings along the beam path between the eyepiece and the objective and is guided by the rings. In consequence, the distance between the eyepiece and the objective is adjustable by shifting the two bodies along the beam path between the eyepiece and the objective relative to each other. According to an embodiment, the first body and the second body are shiftable relative to each other along the beam path between the eyepiece and the objective by a distance which is greater than required for pure focusing in order to enable a reduced total length of the optical plummet when it is not in use.

According to an embodiment, the inner diameter of the annular recess and the inner diameter of the rings of the one body and the outer diameter of the cylindrical outer surface of the other body (not comprising the annular recesses) are selected such that a play-free guide is provided between the cylindrical outer surface and the rings.

According to an embodiment, that body of the first and second bodies in which the two annular recesses are formed has a cylindrical inner surface between the two annular recesses that is coaxial with the two recesses.

The guide of a cylindrical body between two rings is realizable in a technically easy manner and with little play and thus provides a high accuracy.

According to an embodiment, the recesses are positioned between two retaining rings, each of which is directly contiguous to one of the rings and exerts an adjustable pressure thereon. According to an embodiment, for this purpose, the recesses are positioned between two inside threads, each receiving a retaining ring with outside thread, each of said retaining rings being contiguous to one of the rings and exerting an adjustable pressure thereon. The pressure exerted on the respective ring then builds up in a direction parallel to the beam path between objective an eyepiece.

In this way it is possible to adjust the play between the first and second bodies by exerting a pressure on the rings. According to an embodiment, a radial play between the first body and the second body of less than 0.02 mm and, in particular, less than 0.015 mm and, further preferred, less than 0.01 mm is thus achieved.

According to an embodiment, the annular recesses comprise conical surfaces that broaden along the beam path between the eyepiece and the objective in opposite directions to larger inner diameters. The conical surfaces delimit the respective body radially outwards.

Such conical surfaces urge a ring accommodated in the recess of the one body against the cylindrical outer surface of the other body if a pressure is exerted on the ring in a direction parallel to the beam path between objective and eyepiece.

According to a first embodiment, the ring positioned closer to the eyepiece along the beam path between the eyepiece and the objective is a radially slotted ring (a ring having one radial slot and thus not being continuous) having a conical side surface. The conical side surface of the ring is complementary to the conical surface of the recess in which the ring is accommodated and abuts against the same. The ring positioned closer to the objective along the beam path between the eyepiece and the objective is an O-ring. As an alternative, also both rings may be radially slotted rings. According to an embodiment, the slotted rings may be made from metal or plastic material, in particular polytetrafluoroethylene (Teflon).

The use of a slotted ring enables use of harder materials for the rings and thus reductions in the play between the two bodies so that it is very small if the ring is under pressure.

According to an alternative embodiment, the rings are O rings made from elastomer or plastic material, in particular, polytetrafluoroethylene.

Such rings are available at very favorable cost made from different materials with different Shore hardnesses, different diameters and different thicknesses.

According to an embodiment, the O-ring positioned closer to the eyepiece along the beam path between the eyepiece and the objective has a higher Shore hardness than the O-ring positioned closer to the objective in axial direction of the first and second body, respectively.

According to an embodiment, the O-ring positioned closer to the eyepiece along the beam path between the eyepiece and the objective has a Shore hardness of at least 90 and the O-ring positioned closer to the objective in axial direction of the first and second body, respectively, has a Shore hardness of less than 90.

As the ring having the higher Shore hardness is positioned in the vicinity of the target mark, a high accuracy of the plummet can be ensured.

According to an embodiment, the body, which is formed with the spaced apart, coaxial annular recesses, comprises a cylindrical projection between the recesses. Furthermore, the cylindrical outer surface of the other body, which extends axially through the two annular recesses and rings along the beam path between the eyepiece and the objective, comprises an axial groove or recess in which the cylindrical projection is guided. According to an embodiment, that body which is formed with the spaced apart, coaxial annular recesses comprises between said recesses a radial bore with inside thread, said bore penetrating the wall of the body and receiving a screw, one end of which comprises a tool fit and the other end of which comprises a coaxial cylindrical projection (with or without thread). Furthermore, the cylindrical outer surface of the other body, which extends axially through the two annular recesses and rings along the beam path between the eyepiece and the objective, comprises an axial groove or recess in which the cylindrical projection of the screw is guided.

This prevents the first and second bodies from twisting relative to each other. This is helpful in order to ensure a desired orientation of the target mark.

According to an embodiment, the optical plummet further comprises a prism that folds the beam path by 90°, the objective being positioned in the beam path between the target mark and the prism. According to an embodiment, the prism moreover causes an image reversal by being formed with an additional roof section (thus forming an Amici roof prism) in order for the optical plummet to image the ground mark true sided and upright in position.

As a result, the operability of a geodetic instrument or tribrach making use of an optical plummet is not obstructed. Furthermore, the user is enabled to assume a convenient position relative to the optical plummet during use of the plummet.

According to embodiments, the optical plummet described above is integrated in a tribrach for a geodetic instrument. According to an embodiment, this tribrach may also comprise means for horizontally aligning a geodetic instrument supported by the tribrach, such as straight bubble levels positioned orthogonally to each other or a bull's eye level.

According to alternative embodiments, the optical plummet described above is integrated in a geodetic instrument. The latter may, according to an embodiment, also comprise means for horizontally aligning a geodetic instrument supported by the tribrach, such as straight bubble levels positioned orthogonally to each other or a bull's eye level. A horizontal fine adjustment of the geodetic instrument may also be effected electronically in the device.

The integration of the optical plummet in the geodetic instrument allows the determination of a maximum error of the plummet by turning the geodetic instrument together with the optical plummet within the horizontal by 180°.

According to an embodiment of the present invention, an optical plummet for use in geodesy is provided. The optical plummet includes an eyepiece, a target mark, and an objective. The target mark is positioned in the beam path between the eyepiece and the objective and the target mark and the eyepiece are supported by a first body and the objective is supported by a second body. Either the first body or second body has two annular recesses spaced apart from each other along the beam path between the eyepiece and the objective and disposed coaxially with respect to the beam path between the eyepiece and the objective. Each of the annular recesses accommodates a ring. The other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one other along the beam path between the eyepiece and the objective.

According to another embodiment of the present invention, a tribrach for a geodetic instrument includes an optical plummet. The optical plummet includes an eyepiece, a target mark, and an objective. The target mark is positioned in the beam path between the eyepiece and the objective and the target mark and the eyepiece are supported by a first body and the objective is supported by a second body. Either the first body or second body has two annular recesses spaced apart from each other along the beam path between the eyepiece and the objective and disposed coaxially with respect to the beam path between the eyepiece and the objective. Each of the annular recesses accommodates a ring. The other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one other along the beam path between the eyepiece and the objective.

According to a specific embodiment of the present invention, a geodetic instrument is provided. The geodetic instrument includes an optical plummet including an eyepiece, a target mark, and an objective. The target mark is positioned in the beam path between the eyepiece and the objective and the target mark and the eyepiece are supported by a first body and the objective is supported by a second body. Either the first body or second body has two annular recesses spaced apart from each other along the beam path between the eyepiece and the objective and disposed coaxially with respect to the beam path between the eyepiece and the objective, wherein each of the annular recesses accommodates a ring. The other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one other along the beam path between the eyepiece and the objective.

BRIEF DESCRIPTION OF THE DRAWINGS

Further features of the invention become apparent from the following description of embodiments in conjunction with the claims and the Figures. The individual features may be realized in an embodiment according to the invention also in different number and combination than specified in the examples described below. In the following description of some embodiments of the invention, reference is made to the attached Figures, wherein FIG. 1A schematically shows an optical plummet according to a first embodiment of the invention in cross-sectional view;

Wherever possible, the same reference numerals have been used throughout the drawings to refer to elements having the same or substantially similar technical functions. Different embodiments of these elements have similar reference numerals.

DETAILED DESCRIPTION OF THE INVENTION

Figure 1A:
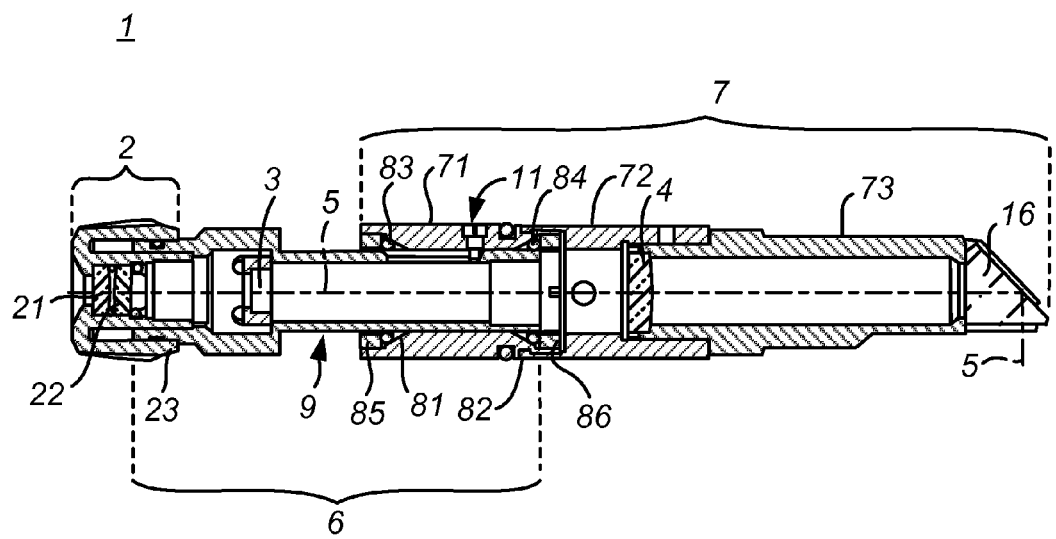
FIG. 1B schematically shows selected elements of the optical plummet of FIG. 1A in enlarged cross-sectional view.
Figure 1B:
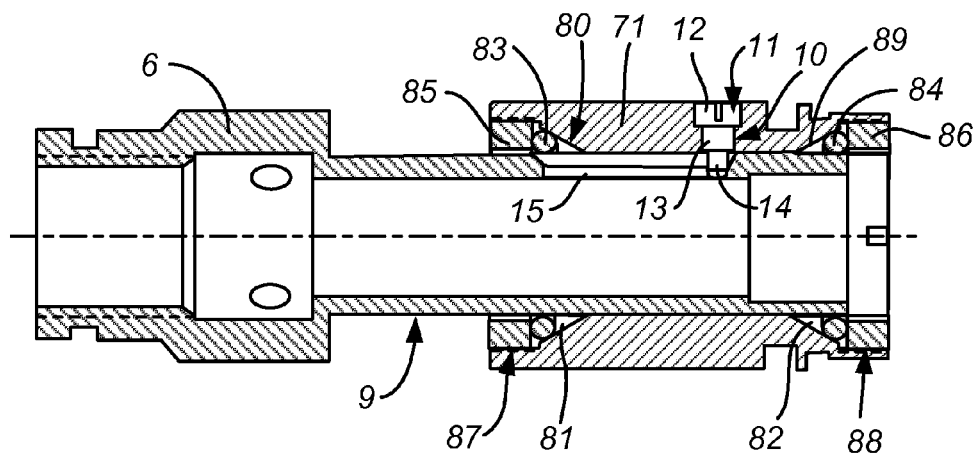

In the following, a first embodiment of an optical plummet is described with reference to FIGS. 1A and 1B.

The optical plummet 1 consists substantially of a first body 6 and a second body 7, said second body 7 partially accommodating said first body 6.

A substantially rotationally symmetric metal body made from aluminum enclosing a hollow space, the interior of which is provided with a light-absorbing coating by anodizing, forms the first body 6. Said hollow space accommodates a target mark 3 and is closed at one end by an eyepiece 2 having two lenses 21, 22. The eyepiece 2 is connected to the first body 6 via a thread 23, so that, by turning the eyepiece 2, a diopter adjustment can be effected by a user. The target mark 3 consists of two adjacent planar glass plates, between which a line mark, for example, a ring, plural concentric rings and/or a cross is positioned. The position of the target mark is adjustable via headless screws (e.g. allen screws). The end of the hollow space of the first body 6 facing away from the eyepiece 2 is open. At the end facing away from the eyepiece 2, the first body 6 has a cylindrical outer surface 9 in which a groove 15 is formed. The groove 15 is oriented in longitudinal direction of the first body 6 and extends over a fourth of the cylindrical outer surface. The present invention is, however, not limited to such dimensions of the groove or the presence of the groove. For example, a recess can replace the groove, or the groove may be dispensed with altogether. The groove 15 interferes with the rotational symmetry of the first body 6.

In the shown embodiment, the second body 7 is composed of three elements 71, 72, 73 made from aluminum that are bonded to each other. Each element 71, 72, 73, per se, is a substantially rotationally symmetric metal body. The present invention is, however, not limited to a multi-part second body or a specific kind of joining of the elements forming the second body. For example, the elements can also be screwed or welded together, or the second body may be formed as single-piece part.

The second body 7, too, encloses a substantially cylindrical hollow space, the interior of which is provided with a light absorbing coating by anodizing. The cylindrical hollow space of the second body 7 accommodates an objective lens 4. A prism with roof section (Amici roof prism) is disposed at one end of the hollow space of the second body 7. Said prism 16 folds the beam path 5 guided by the objective lens 2, the target mark 3 and the objective lens 4 by 90°. At the same time, said prism 16 effects a side reversal of the image. It is emphasized that the provision of the prism 16 is only optional. At the end facing away from the prism 16 the hollow space of the second body 7 receives a portion of the first body 6.

Two annular recesses 81, 82 are formed on the inside of the element 71 of the second body 7 which are limited in radial direction by conical surfaces 80, 89 which broaden along the beam path between eyepiece 2 and objective lens 4 in opposite directions to larger inner diameters. Between the two recesses 81 and 82, the element 71 of the second body 7 has a cylindrical inner surface, the diameter of which is larger than the diameter of the cylindrical outer surface 9 of the first body 6. Two O-rings 83, 84 made from elastomer are accommodated in the recesses 81 and 82 of the element 71 of the second body 7. The O-rings 83 and 84 are held by retaining rings 85, 86 that are connected to the element 71 through threads 87, 88 and exert pressure on the respective adjacent O-rings 83 and 84 parallel to the beam path between eyepiece 2 and objective lens 4. The threads 87, 88 are directly contiguous to the respective recesses 81, 82. The O-ring 83 positioned closer to the eyepiece 2 in the direction of the beam path between eyepiece 2 and objective lens 4 consists of polytetrafluoroethylene and has a Shore hardness of 95. The O-ring 84 positioned closer to the objective lens 4 in axial direction is made from polypropylene and has a Shore hardness of 80. However, the present invention is not limited to these Shore hardness values or the use of O-rings made from elastomer. If use is made from O-rings made from elastomer, the O-ring positioned closer to the eyepiece may have a Shore hardness of at least 90 and the O-ring positioned closer to the objective lens 4 may have a Shore hardness of below 90 according to an embodiment. As an alternative, the O-rings may also have the same Shore hardness.

The cylindrical outer surface 9 of the first body 6 extends coaxially through the O-rings 83, 84 and is guided by the O-rings 83, 84. The play of this guide is adjustable by means of the retaining rings 85, 86 such that there is provided a play-free guide between the O-rings 83, 84 and the cylindrical outer surface 9.

Element 71 of the second body 7 further comprises a bore 10 with inside thread, said bore 10 penetrating the wall of the element 71 and receiving a screw 11. One end of the screw 11 comprises a tool fit and the other end 13 of the screw 11 has a coaxial cylindrical projection 14 without thread which is guided in the groove 15 of the first body 6 to prevent the first body 6 from twisting with respect to the second body 7 and to limit the relative movement between the first and second bodies 6, 7 by stops. Instead of the screw 11, other measures may be provided to prevent the first and second bodies from twisting relative to one another and to limit the relative movement between the first and second bodies 6,7. The bore 10 of the screw 11 interferes with the rotational symmetry of the element 71 of the second body 7.

Although in the embodiment described above the use of two O-rings 83, 84 made from elastomer is described for guiding the first body 6 in the second body 7, the present invention is not limited to such a configuration.

In the embodiment described above, both the first and the second body 6, 7 are made from metal. However, the present invention is not limited to a specific material. For example, the bodies may also by made from plastic material and consist of the same or different materials.

Furthermore, in the embodiment described above, the second body 7 accommodates a portion of the first body 6. However, the present invention is not limited to such a configuration. As an alternative, the first body may accommodate a portion of the second body. This is schematically shown in FIG. 2.

Figure 2A:
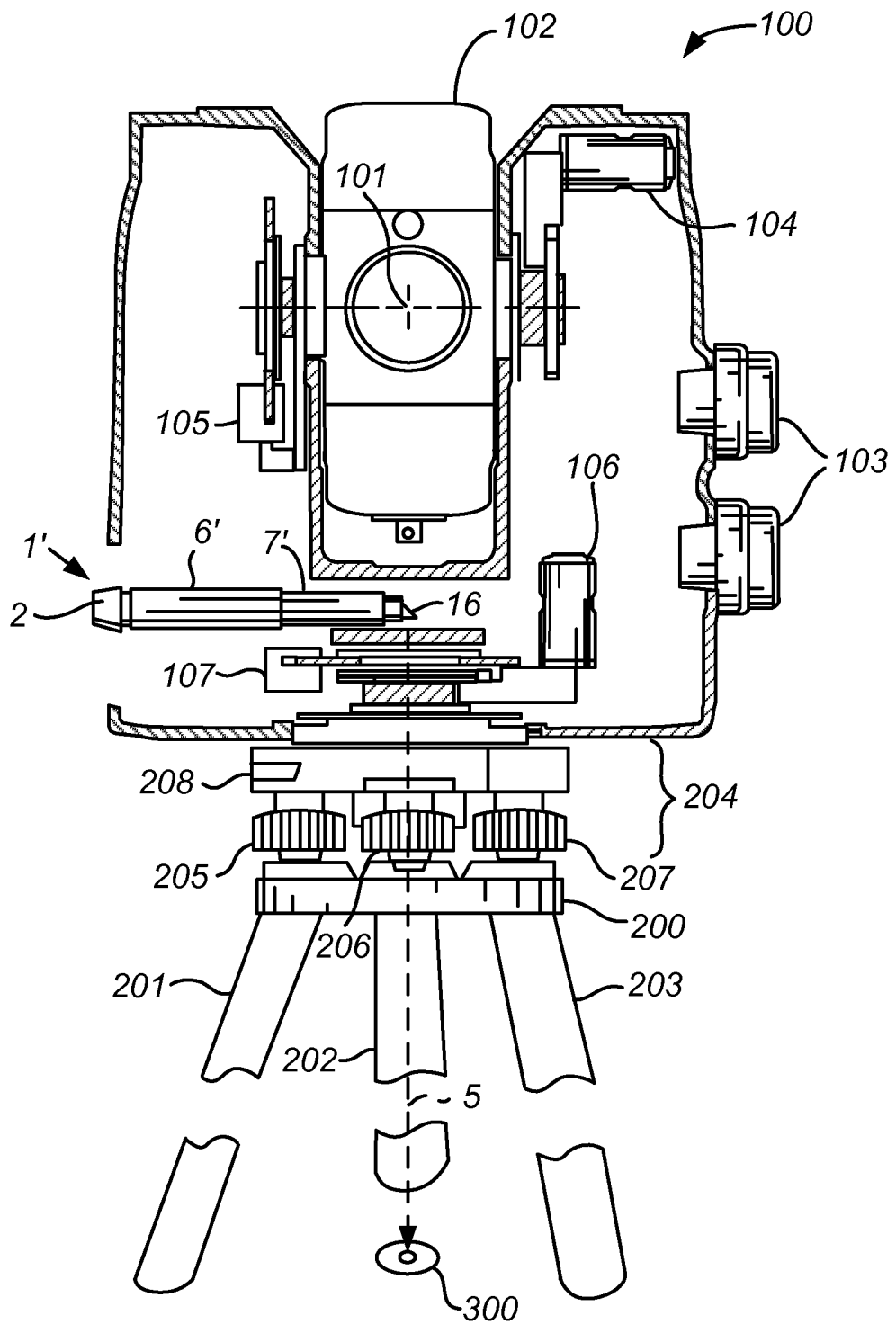
FIG. 2A schematically shows a geodetic instrument, in partially cut-open view, wherein an optical plummet according to a second embodiment of the invention is integrated.

FIG. 2A shows the use of an optical plummet 1' in a geodetic instrument 100. The optical plummet 1' has a structure as described with reference to FIGS. 1A and 1B, except that it is not the second body 7 comprising the objective lens 4 which partially receives the first body 6 comprising the target mark 3, but, vice versa. It is the first body 6' supporting the eyepiece 2 and accommodating the target mark 3 which partially receives the second body 7' comprising the objective lens 4. To this end, recesses 81 and 82 are provided in the first body 6' in correspondence with the embodiment shown in FIGS. 1A and 1B. Each recess accommodates a ring on which pressure is exerted by means of a respective retaining ring. Other than shown in FIGS. 1A, 1B, these recesses have no conical surface, but are formed by a radial wall and an axial base. A cylindrical outer surface of the second body 7' is guided by these two rings.

As shown in FIG. 2A, the optical plummet 1' is positioned in the geodetic instrument 100 such that the beam path 5 of the optical plummet 1' and a measurement axis 101 of a measurement part 102 of the geodetic instrument and a detector (not shown) of the measurement part 102 are arranged along one line. In FIG. 2A, the measurement axis 101 of the measurement part 102 hits the line defined by the beam path 5 of the optical plummet 1' orthogonally. Such a positioning of the optical plummet 101 in the geodetic instrument 100 ensures that the measurement axis 101 and the detector of the measurement part 102 may be precisely placed above a measurement mark 300.

In the present embodiment, the measurement part 102 may be moved about two axes either by means of motors 104, 106 or by means of adjustment wheels 103, the degree of movement being measurable by means of light barriers 105 and 107.

The geodetic instrument 100 is connected, via a tribrach 204, to a base plate 200 of a tripod, the latter comprising, besides the base plate 200, three legs 201, 202, 203 of adjustable length. The tribrach 204 is horizontally movable with respect to the base plate 200 of the tripod and arrestable in a desired position. The base plate 200 of the tripod comprises an opening for the beam path 5 of the optical plummet 1' to pass through. Adjustment screws 205, 206 and 207 of the tribrach 204 enable the geodetic instrument 100 to be horizontally aligned. In order to determine the horizontal, the tribrach 204 comprises two straight bubble levels 208 which are oriented orthogonally with respect to each other. The tribrach 204 comprises an opening through which the beam path 5 of the optical plummet 1' extends.

It is understood that, although in the embodiment described above the optical plummet 1' is integrated in the geodetic instrument 100, the present invention is not limited to such a configuration. As an alternative, the optical plummet may, for example, be also integrated in the tribrach 204. This is schematically shown in FIG. 2B.

Figure 2B:
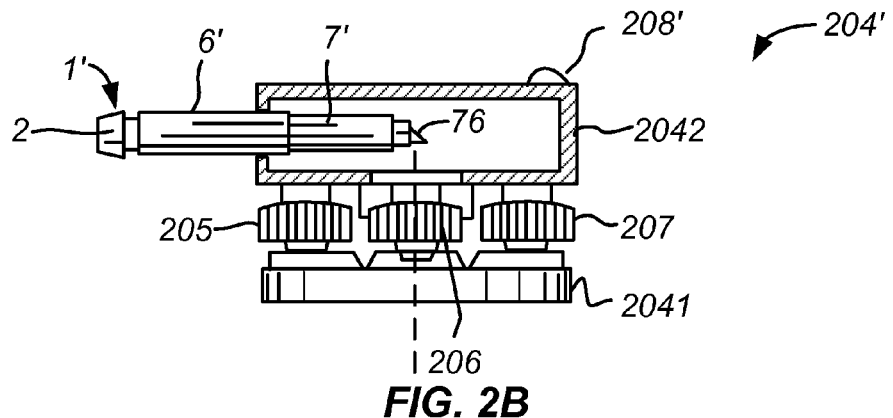
FIG. 2B schematically shows a tribrach, in partially cut-open view, wherein an optical plummet according to the second embodiment of the invention is integrated.

FIG. 2B schematically shows the use of an optical plummet 1' in a tribrach 204'. The tribrach consists of a first coupling plate 2041 configured to be connected to a base plate 200 of a tripod and a second coupling plate 2042 configured to be connected to a geodetic instrument. Between the first and the second coupling plates 2041, 2042, there are provided adjustment screws 205, 206, 207 for the second coupling plate 2042 to be horizontally aligned. To this end, the second coupling plate 2042 comprises a bull's eye level 208'.

The optical plummet 1' described with reference to FIG. 2A is accommodated in the interior of the second coupling plate 2042. The first and second coupling plates 2041, 2042 each comprise openings through which the beam path 5 of the optical plummet 1' extends.

Figure 3A:
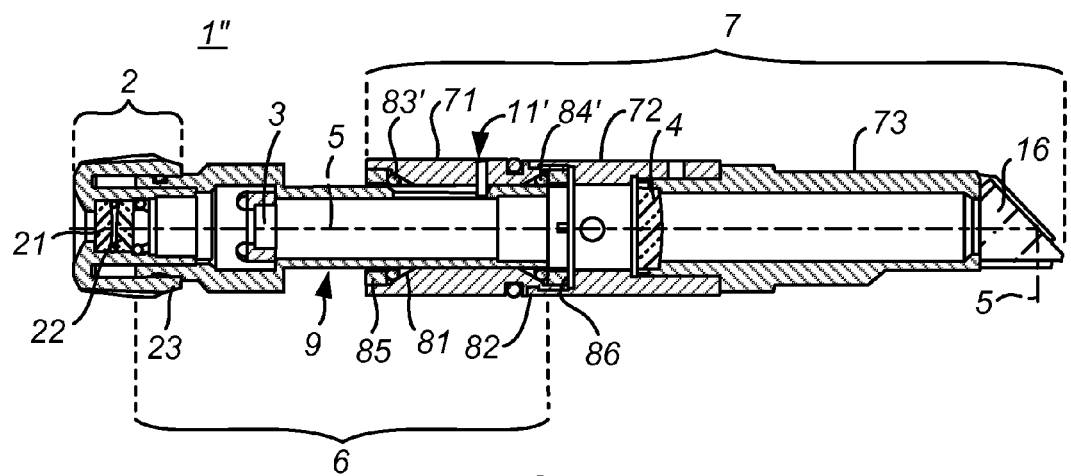
FIG. 3A schematically shows an optical plummet according to a third embodiment of the invention in cross-sectional view.
Figure 3B:
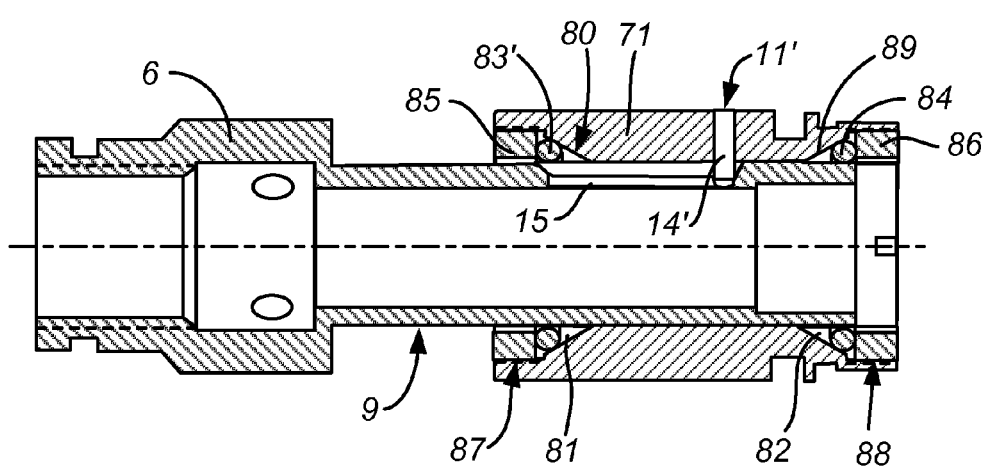
FIG. 3B schematically shows selected elements of the optical plummet of FIG. 3A in enlarged cross-sectional view.

A third embodiment of an optical plummet 1" is schematically shown in FIGS. 3A and 3B. This third embodiment corresponds in essential elements to the first embodiment described with reference to FIGS. 1A and 1B. Therefore, only the differences are described in further detail below.

According to the third embodiment, the first and second bodies 6 and 7 are not made from metal, but from plastic material. Furthermore, the ring positioned closer to the eyepiece 2 along the beam path between eyepiece 2 and objective lens 4 is, instead of an O-ring made from elastomer, a slotted ring 83' made from metal having a side surface which is complementary to the conical surface 80 of the recess 81 and abuts against the conical surface 80 of the recess 81. The ring 84' positioned closer to the objective lens 4, too, is a correspondingly slotted metal ring. Finally, instead of the screw 11, a pin 11' is pressed into the first element 71 of the second body and guided in the groove 15 of the first body 6. The present invention is, however, not limited to slotted rings made from metal. As an alternative, the rings having a side surface being complementary to the conical surface 80 of the recess 81 can also be made from plastic material.

Although the above embodiments of the present invention have been described merely by way of example, it will be readily appreciable for the persons skilled in the art that numerous modifications, additions and replacements are possible without departing from the scope and spirit of the invention as disclosed in the following claims.

What is claimed is:

1. An optical plummet for use in geodesy, the optical plummet comprising:
    an eyepiece;
    a target mark; and
    an objective;
    wherein the target mark is positioned in the beam path between the eyepiece and the objective,
    wherein the target mark and the eyepiece are supported by a first body and the objective is supported by a second body,
    wherein either the first body or second body has two annular recesses spaced apart from each other along the beam path between the eyepiece and the objective and disposed coaxially with respect to the beam path between the eyepiece and the objective, wherein each of the annular recesses accommodates a ring, and
    wherein the other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one another along the beam path between the eyepiece and the objective.

2. The optical plummet according to claim 1 wherein the recesses are disposed between two retaining rings, each of which is directly contiguous to one of the rings and exerts an adjustable pressure thereon.

3. The optical plummet according to claim 2 wherein the annular recesses comprise conical surfaces which broaden along the beam path between the eyepiece and the objective in opposite directions to larger inner diameters.

4. The optical plummet according to claim 2 wherein the rings are O-rings made from elastomer or polytetrafluoroethylene.

5. The optical plummet according to claim 4 wherein the O-ring positioned closer to the eyepiece along the beam path between the eyepiece and the objective has a higher Shore hardness than the O-ring positioned closer to the objective in axial direction of the first body and the second body, respectively.

6. The optical plummet according to claim 4 wherein the O-ring positioned closer to the eyepiece along the beam path between the eyepiece and the objective has a Shore hardness of at least 90 and the O-ring positioned closer to the objective in axial direction of the first body and second body, respectively, has a Shore hardness of less than 90.

7. The optical plummet according to claim 3 wherein the ring that is positioned closer to the eyepiece along the beam path between the eyepiece and the objective is a radially slotted ring having a conical side surface which is complementary to the conical surface of the recess in which the ring is disposed and abuts against the same, and the ring which is positioned closer to the objective along the beam path between the eyepiece and the objective is an O-ring.

8. The optical plummet according to claim 1 wherein the annular recesses comprise conical surfaces which broaden along the beam path between the eyepiece and the objective in opposite directions to larger inner diameters.

9. The optical plummet according to claim 8 wherein the ring that is positioned closer to the eyepiece along the beam path between the eyepiece and the objective is a radially slotted ring having a conical side surface which is complementary to the conical surface of the recess in which the ring is disposed and abuts against the same, and the ring which is positioned closer to the objective along the beam path between the eyepiece and the objective is an O-ring.

10. The optical plummet according to claim 1 wherein the rings are O-rings made from elastomer or polytetrafluoroethylene.

11. The optical plummet according to claim 10 wherein the O-ring positioned closer to the eyepiece along the beam path between the eyepiece and the objective has a higher Shore hardness than the O-ring positioned closer to the objective in axial direction of the first body and the second body, respectively.

12. The optical plummet according to claim 10 wherein the O-ring positioned closer to the eyepiece along the beam path between the eyepiece and the objective has a Shore hardness of at least 90 and the O-ring positioned closer to the objective in axial direction of the first body and second body, respectively, has a Shore hardness of less than 90.

13. The optical plummet according to claim 1:
    wherein the body that is formed with the spaced apart, coaxial annular recesses has a coaxial cylindrical projection, and
    wherein the cylindrical outer surface of the body which extends coaxially through the two annular recesses and rings along the beam path between the eyepiece and the objective comprises an axial groove or recess in which the cylindrical projection is guided.

14. The optical plummet according to claim 1 further comprising a prism folding the beam path by 90°, wherein the objective is positioned in the beam path between the target mark and the prism.

15. A tribrach for a geodetic instrument, comprising an optical plummet, the optical plummet comprising:
    an eyepiece;
    a target mark; and
    an objective;
    wherein the target mark is positioned in the beam path between the eyepiece and the objective,
    wherein the target mark and the eyepiece are supported by a first body and the objective is supported by a second body,
    wherein either the first body or second body has two annular recesses spaced apart from each other along the beam path between the eyepiece and the objective and disposed coaxially with respect to the beam path between the eyepiece and the objective, wherein each of the annular recesses accommodates a ring, and
    wherein the other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one another along the beam path between the eyepiece and the objective.

16. The tribrach according to claim 15 wherein the recesses of the optical plummet are disposed between two retaining rings, each of which is directly contiguous to one of the rings and exerts an adjustable pressure thereon.

17. The tribrach according to claim 15 wherein the annular recesses of the optical plummet comprise conical surfaces which broaden along the beam path between the eyepiece and the objective in opposite directions to larger inner diameters.

18. A geodetic instrument comprising an optical plummet, the optical plummet comprising:
   an eyepiece;
   a target mark; and
   an objective;
   wherein the target mark is positioned in the beam path between the eyepiece and the objective,
   wherein the target mark and the eyepiece are supported by a first body and the objective is supported by a second body,
   wherein either the first body or second body has two annular recesses spaced apart from each other along the beam path between the eyepiece and the objective and disposed coaxially with respect to the beam path between the eyepiece and the objective, wherein each of the annular recesses accommodates a ring, and
   wherein the other body has at least sectionally a cylindrical outer surface extending coaxially through the two annular recesses and rings along the beam path between the eyepiece and the objective and is guided by the rings such that the distance between the eyepiece and the objective is adjustable by moving the first body and the second body relative to one another along the beam path between the eyepiece and the objective.

19. The geodetic instrument according to claim 18 wherein the recesses of the optical plummet are disposed between two retaining rings, each of which is directly contiguous to one of the rings and exerts an adjustable pressure thereon.

20. The geodetic instrument according to claim 18 wherein the annular recesses of the optical plummet comprise conical surfaces which broaden along the beam path between the eyepiece and the objective in opposite directions to larger inner diameters.

* * * * *